3,328,129
PRODUCTION OF BORON CARBIDE

Akinori Muta and Tetsuo Gejo, Suginami-ku, Tokyo-to, and Masao Shiozawa, Hitachi-shi, Japan, assignors to Kabushiki Kaisha Hitachi Seisakusho, Tokyo-to, Japan, a joint-stock company of Japan
No Drawing. Filed Dec. 31, 1963, Ser. No. 334,903
Claims priority, application Japan, Jan. 9, 1963, 38/158
7 Claims. (Cl. 23—208)

This invention relates to a new method for producing boron carbide.

Heretofore, boron carbide has been widely used as an abrasive because of its hardness which is second only to that of diamond. However, since boron carbide has other excellent properties such as physical and chemical stability and large cross sections for absorption of thermal neutrons, it has received much attention in recent years as an industrial material in the atomic power industries and chemical industries.

The following principal methods for producing boron carbide are known.

(1) The method of causing a boron compound to react with carbon.
(2) The method of causing metallic boron to react with carbon.
(3) The method of causing a boron compound to react with carbon and magnesium.

The above method 1 must be carried out at a super-high temperature of 2,400 deg. C. or higher. In method 2, high-priced metallic boron must be used. The reaction utilized in method 3 is as follows:

$$2B_2O_3 + 6Mg + C = B_4C + 6MgO$$

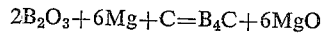

This method is superior to the methods 1 and 2, because it does not require the use of high-priced metallic boron and can be carried out at a temperature of the order of 1,200 deg. C. The reaction of this third method, however, entails difficulties such as the extremely rapid and violent reaction of reduction of anhydrous boric acid due to the magnesium, that is, the reaction of formation of the boron carbide, whereby the product is scattered, and the yield is made poor. Moreover, in the case of reaction with large quantities of reactants, the gases of the reaction system expand abruptly in a dangerous manner.

It is an object of the present to overcome these difficulties and to provide an economical and safe method for producing boron carbide with high yield through the use of boron compounds as starting material.

The foregoing object has been achieved by the present invention, which, briefly described, resides in a method for producing boron carbide wherein, to the reactants consisting of a boron compound, carbon, and magnesium, a reaction inhibitor which does not react with any of the said reactants is further added, i.e., a solid inert diluent, and the resulting mixture is heated to a temperature in the range of from 1,200 to 2,400 deg. C.

More specifically, a boron compound such as an oxide of boron or sodium borate, magnesium powder, active carbon, and a compound for example, magnesium oxide, calcium oxide, alumina, or silica, are prepared to certain particle sizes, dried, and mixed. The boron compound, active carbon, and magnesium are preferably mixed in their respective theoretical proportions, and the oxide inhibitor is preferably added thereto in a proportion in the range of from approximately 5 to 100 percent by weight relative to the total quantity of these three reactants.

After mixing, the resulting mixture is heated for approximately one hour at a temperature of 1,200 deg. C. in a stream of neutral gas such as argon, nitrogen, or hydrogen and is then cooled. Thereafter, the resulting product is treated with heated acid, and the residue so obtained is dried, whereby boron carbide is obtained.

By the practice of the method of the present invention as described above, the addition of a reaction inhibitor, for example, an oxide, to the reactants causes a decrease in the apparent reaction speed. At the same time, the addition of the oxide causes a physical obstruction to the mutual contact between the reactants, thereby causing the reaction to proceed very gradually, whereby the scattering of the product and the abrupt expansion of the gases during reaction are completely eliminated, and it is possible to produce boron carbide with an extremely high yield without any danger. Moreover, the method of the invention does not require high-priced metallic boron but can be effectively carried out with a supply of low-priced anhydrous boric acid.

In order to indicate more fully the nature of the present invention, the following example of typical procedure is set forth, but this example is presented as illustrative only, and it is not intended to limit the scope of the invention.

Example

The grain sizes of appropriate quantities of anhydrous boric acid, magnesium powder, active carbon, and magnesium oxide were separately prepared to between 100 and 150 mesh, and each starting material was dried at 110 deg. C. for approximately one hour. Next, 139 grams of the anhydrous boric acid, 146 grams of the magnesium powder, 12 grams of the active carbon, and 29.7 grams of the magnesium oxide were mixed and then heated at 1,200 deg. C. for one hour in an argon stream flowing at a flow-rate of 1,000 cc./min. Then the batch of the reaction product was cooled to room temperature and thoroughly treated for a long time with a 50 percent solution of sulfuric acid at 100 deg. C. to dissolve out slag, free boron, and unreacted anhydrous boric acid. The resulting product was filtered, and the retained solid material was washed with water, and the resulting residue was dried at 110 deg. C. The weight of the product, boron carbide, was 51.2 grams, and the yield was 92.6 percent. The result of analysis of this boron carbide showed a boron content of 76.1 percent and a carbon content of 23.2 percent.

For comparison, a similar procedure was carried out without the addition of the magnesium oxide to the above-stated reactants. After reaction and similar after-treatment, 41.1 grams of the product boron carbide was obtained with a yield of 70.5 percent. The result of analysis of this boron carbide showed a boron content of 76.5 percent and a carbon content of 23.1 percent.

As clearly indicated by the above example, when a reaction inhibitor, for example, magnesium oxide, is added beforehand to the reactants, danger during reaction is eliminated, and the yield can be increased by approximately 22 percent. Moreover, since the added magnesium oxide is readily dissolved by the hot sulfuric acid, it has absolutely no effect on the purity of the product.

Thus, by the practice of the present invention, it is possible to produce boron carbide readily at low cost.

It should be understood, of course, that the foregoing disclosure relates to only a preferred example of the invention and that it is intended to cover all changes and modifications of the example of the invention herein chosen for the purposes of the disclosure, which do not constitute departures from the spirit and scope of the invention as set forth in the appended claims.

What is claimed is:

1. A method of producing boron carbide comprising the steps of mixing a compound selected from the group consisting of boron oxide and sodium borate with carbon and magnesium, adding thereto 5 to 100 weight percent of a solid inert diluent selected from the group consisting of magnesium oxide, calcium oxide, aluminum and silica, heating said mixture at a temperature of 1200 to 2400° C. in an inert gas atmosphere, cooling to room temperature, and washing out and drying the boron carbide thus obtained.

2. The method as defined in claim 1, wherein said diluent is magnesium oxide.

3. The method as defined in claim 1, wherein said diluent is calcium oxide.

4. The method as defined in claim 1, wherein said diluent is silica.

5. The method as defined in claim 1, wherein said diluent is alumina.

6. In a process for the manufacture of boron carbide by the reaction of a boron compound and carbon at a temperature of 1200 to 2400° C. in the presence of elemental magnesium, the improvement which comprises adding to the reactants 5 to 100 weight percent of a solid inert diluent to retard the reaction, to prevent scattering and the expansion of gases, said diluent being selected from the group consisting of magnesium oxide, calcium oxide, alumina and silica.

7. In a process for the production of boron carbide according to the equation $$2B_2O_3 + C + 6Mg = B_4C + 6MgO$$

at temperatures of substantially 1200–2400° C. in an inert gas atmosphere, the improvement which comprises incorporating in the reaction mixture approximately 5 to 100 weight percent, calculated on the total reactants as named in said equation, of a solid inert diluent to retard the reaction, to prevent scattering and the expansion of gases, said diluent being selected from the group consisting of magnesium oxide, calcium oxide, alumina and silica.

References Cited

UNITED STATES PATENTS 2,834,651   5/1958   Gray _____ 23—208

FOREIGN PATENTS 740,547   11/1955   Great Britain.
898,403   6/1962    Great Britain.

OSCAR R. VERTIZ, *Primary Examiner.*

G. T. OZAKI, *Examiner.*